Aug. 24, 1926.

M. NITZSCHE 1,597,473

BLOW-OUT PATCH FOR AUTOMOBILE TIRES

Filed Oct. 22, 1924

INVENTOR
Max Nitzsche
BY
ATTORNEY

Patented Aug. 24, 1926.

1,597,473

UNITED STATES PATENT OFFICE.

MAX NITZSCHE, OF ORANGE, NEW JERSEY.

BLOW-OUT PATCH FOR AUTOMOBILE TIRES.

Application filed October 22, 1924. Serial No. 745,069.

This invention relates to blowout patches for pneumatic tires, more particularly automobile tires, these patches being used inside the outer tire, commonly called the shoe, to form a temporary closure for a blowout hole.

In the application of blowout patches, of the type commonly constructed, considerable difficulty is generally experienced in properly fitting the patch inside the shoe, with its edges engaged between the tire bead and the rim channel. The present invention has for its object to provide a novel and improved form of blowout patch that can be readily fitted in position in the shoe.

For further comprehension of the invention, and of the objects and advantages thereof, reference will be had to the following description and accompanying drawing, and to the appended claims in which the various novel features of the invention are more particularly set forth.

Fig. 1 of the drawing is a side view showing a portion of an automobile tire with my improved blowout patch fitted thereon ready for application of the tire to the rim.

Figure 1:
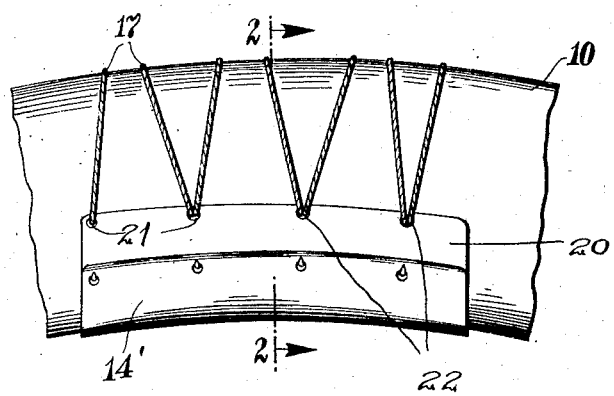
Figures 2, 3:
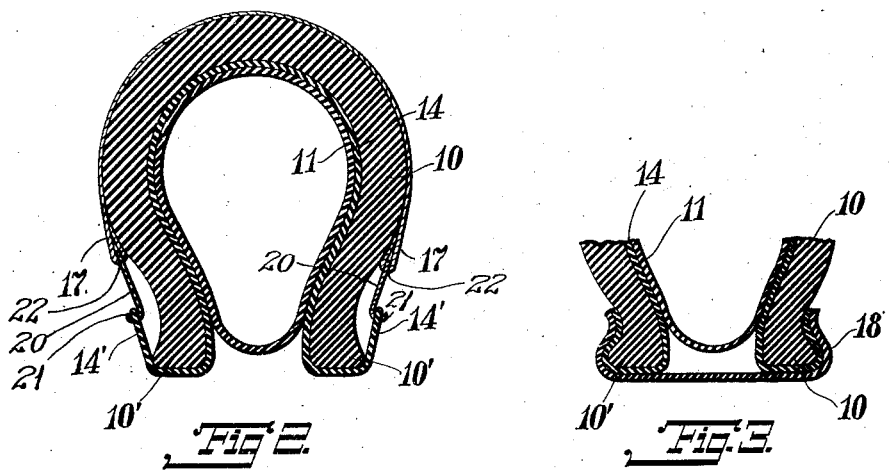
Fig. 2 is a transverse sectional view taken on the line 2—2 of Fig. 1.
Fig. 3 is a fragmentary transverse sectional view showing the tire in position on the rim with the edges of the patch cut off.
Figure 4:
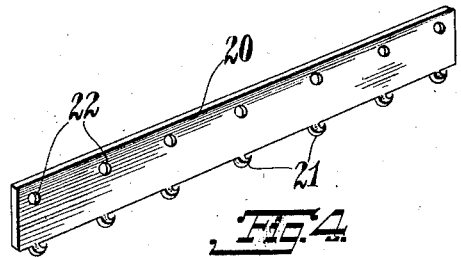
Fig. 4 is a detail perspective view showing one of the metal straps that may be employed to grip the edges of the patch.

Referring now to the drawing, the reference numeral 10 indicates a portion of an ordinary outer tube or shoe of an automobile tire, the usual inner tube being indicated at 11. In the event of a blowout of the shoe a patch is made by applying inside the shoe a sheet of a suitable flexible material. This sheet is indicated at 14 in the drawing. In order to make certain of this patch retaining its position it is desirable that the edges thereof be engaged under the beads 10' of the tire shoe, that is to say between said beads and the rim of the wheel. It is in practice an exceedingly difficult matter to mount the tire on the rim with a blowout patch of ordinary construction in the tire and to properly engage the edges of the patch under the shoe beads, while at the same time preventing shifting of the patch in the tire.

To obviate this difficulty my improved patch is made from a sheet of such width that the edges thereof extend considerably beyond the beads 10' when the patch is in position. These edge portions 14' of the patch are each engageable with a pair of metal straps 20, each having a row of pointed hooks 21 formed along one edge, and a series of apertures 22 spaced therealong near its other edge. The cord 17 may be permanently laced through these apertures. When the edges of the patch are to be turned outward the two straps 20 are placed one on each side of the tire with the cord 17 extending across the latter. The hooks 21 are then engaged with the edges 14' of the sheet 14, and the cord 17 is tightened. The tire may be then mounted on the rim 18 and after the tire has been placed in position on the rim the edges of the patch sheet are trimmed off flush with the flanges of the rim. The patch is thus securely held in place on the tire, and as will be apparent, the tire may be applied to the rim, with the patch in place, with no more work than is required to place any tire on a rim.

Having thus described my invention what I claim as new and desire to protect by Letters Patent of the United States is as follows:—

1. The combination in a device for holding an inside blow-out patch within a tire while the tire is being placed upon a rim, the blow-out patch including flaps passing beneath the beads of the tire, of a pair of metal straps, each having a row of pointed hooks formed along the lower edges to engage with said flaps of the blow-out patch, and a series of apertures spaced along the upper edges, and a portion of cord permanently laced through said apertures.

2. The combination in a device for holding an inside blow-out patch within a tire while the tire is being placed upon a rim, the blow-out patch including flaps passing beneath the beads of the tire, of a pair of metal straps, each having a row of pointed hooks to engage with said flaps of the blowout patch, and a series of apertures spaced along the upper edges, and a portion of cord permanently laced through said apertures.

3. The combination in a device for holding an inside blow-out patch within a tire while the tire is being placed upon a rim, the blow-out patch including flaps passing beneath the beads of the tire, of a pair of metal straps, each having a row of pointed hooks formed along the lower edges to engage with said flaps of the blow-out patch, and a series of apertures spaced therealong, and a portion of cord permanently laced through said apertures.

In testimony whereof I have affixed my signature.

MAX NITZSCHE.